United States Patent
Palm et al.

(10) Patent No.: US 10,225,783 B2
(45) Date of Patent: Mar. 5, 2019

(54) METHOD AND APPARATUS FOR PROVIDING PEER BASED NETWORK SWITCHING

(71) Applicant: Google Inc., Mountain View, CA (US)

(72) Inventors: Jeffrey de Blanc Palm, New York, NY (US); Weihua Tan, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/088,383

(22) Filed: Apr. 1, 2016

(65) Prior Publication Data

US 2017/0289894 A1    Oct. 5, 2017

(51) Int. Cl.
| | |
|---|---|
| *H04W 36/30* | (2009.01) |
| *H04W 36/14* | (2009.01) |
| *H04W 76/14* | (2018.01) |
| *H04W 76/12* | (2018.01) |
| *H04W 88/04* | (2009.01) |
| *H04W 88/06* | (2009.01) |

(Continued)

(52) U.S. Cl.
CPC ........... *H04W 36/30* (2013.01); *H04W 36/14* (2013.01); *H04W 76/12* (2018.02); *H04W 76/14* (2018.02); *H04W 8/183* (2013.01); *H04W 36/0085* (2018.08); *H04W 88/04* (2013.01); *H04W 88/06* (2013.01)

(58) Field of Classification Search
CPC .............................. H04W 88/08; H04W 40/12
USPC ...... 455/456.1, 423, 558, 436, 435.1, 404.2; 370/235, 331, 329, 338, 252, 237
See application file for complete search history.

(56) References Cited

U.S. PATENT DOCUMENTS

| | | |
|---|---|---|
| 6,128,490 A | 10/2000 | Shaheen et al. |
| 6,381,315 B1 | 4/2002 | Nhaissi |

(Continued)

FOREIGN PATENT DOCUMENTS

| | | |
|---|---|---|
| EP | 1885144 A2 | 2/2008 |
| EP | 2244501 A1 | 10/2010 |

(Continued)

OTHER PUBLICATIONS

Bircher et al., "An Agent-Based Architecture for Service Discovery and Negotiation in Wireless Networks," University of Bern, Wired/Wireless Internet Comms. (WWIC), Jan. 21, 2004.

(Continued)

*Primary Examiner* — Kiet M Doan
(74) *Attorney, Agent, or Firm* — Faegre Baker Daniels LLP

(57) ABSTRACT

A mobile device that supports a plurality of SIM profiles each corresponding to a different wireless network, measures a current network quality of a first wireless network and obtains network quality information for a second wireless mobile peer device as measured by the mobile peer device. The mobile device switches from the first wireless network to the second wireless network based on the obtained network quality information from the mobile peer device and based on the current network quality of the first wireless network by the mobile device. The network quality measurement received from the mobile peer device is provided through a wireless peer to peer communication link such as a Bluetooth link or other suitable non-internet protocol peer to peer communication link. The mobile peer device also supports a plurality of SIM profiles. Corresponding methods are also described.

20 Claims, 6 Drawing Sheets

(51) Int. Cl.
*H04W 8/18* (2009.01)
*H04W 36/00* (2009.01)

(56) References Cited

U.S. PATENT DOCUMENTS

| | | | |
|---|---|---|---|
| 6,633,761 B1 | 10/2003 | Singhal et al. | |
| 7,180,898 B2 | 2/2007 | Yoshida et al. | |
| 7,433,929 B2 | 10/2008 | Guilford et al. | |
| 7,509,131 B2 | 3/2009 | Krumm et al. | |
| 7,809,360 B2 | 10/2010 | Agrawal et al. | |
| 7,848,292 B2 | 12/2010 | Bi et al. | |
| 8,131,317 B2 | 3/2012 | Lee | |
| 8,155,081 B1 | 4/2012 | Mater et al. | |
| 8,165,581 B2 | 4/2012 | Joshi et al. | |
| 8,200,217 B2 | 6/2012 | Kanade et al. | |
| 8,238,980 B1 | 8/2012 | Shusterman | |
| 8,391,192 B2 | 3/2013 | Prakash et al. | |
| 8,477,645 B2 | 7/2013 | Scherzer et al. | |
| 8,484,568 B2 | 7/2013 | Rados et al. | |
| 8,542,637 B2 | 9/2013 | Bandhakavi et al. | |
| 8,565,766 B2 | 10/2013 | Scherzer et al. | |
| 8,590,023 B2 | 11/2013 | Gupta et al. | |
| 9,648,537 B2 | 5/2017 | Tan et al. | |
| 2002/0169716 A1 | 11/2002 | Johnson et al. | |
| 2004/0246920 A1 | 12/2004 | Savolainen | |
| 2005/0245269 A1 | 11/2005 | Demirhan et al. | |
| 2006/0098625 A1 | 5/2006 | King et al. | |
| 2006/0193295 A1 | 8/2006 | White et al. | |
| 2007/0037550 A1 | 2/2007 | Rassam | |
| 2007/0064684 A1 | 3/2007 | Kottilingal | |
| 2007/0127391 A1 | 6/2007 | Goodman | |
| 2007/0147317 A1 | 6/2007 | Smith et al. | |
| 2007/0183374 A1 | 8/2007 | Classon et al. | |
| 2008/0002668 A1 | 1/2008 | Asokan et al. | |
| 2008/0009279 A1 | 1/2008 | Sakawa | |
| 2008/0107051 A1 | 5/2008 | Chen et al. | |
| 2008/0233977 A1 | 9/2008 | Xu et al. | |
| 2009/0061862 A1 | 3/2009 | Alberth, Jr. et al. | |
| 2009/0168757 A1 | 7/2009 | Bush | |
| 2009/0298467 A1 | 12/2009 | Zohar | |
| 2010/0167719 A1* | 7/2010 | Sun | H04W 36/0088 |
| | | | 455/423 |
| 2010/0172323 A1 | 7/2010 | Rexhepi et al. | |
| 2010/0304737 A1 | 12/2010 | Jain et al. | |
| 2011/0096673 A1 | 4/2011 | Stevenson et al. | |
| 2011/0216694 A1 | 9/2011 | Plasberg et al. | |
| 2011/0269423 A1 | 11/2011 | Schell et al. | |
| 2011/0306318 A1 | 12/2011 | Rodgers et al. | |
| 2012/0014271 A1 | 1/2012 | Damenti | |
| 2012/0052914 A1 | 3/2012 | Yaqub et al. | |
| 2012/0094653 A1 | 4/2012 | Okuda | |
| 2012/0108206 A1 | 5/2012 | Haggerty et al. | |
| 2012/0178488 A1 | 7/2012 | Jonker et al. | |
| 2012/0195223 A1 | 8/2012 | Raleigh | |
| 2012/0282915 A1 | 11/2012 | Haynes et al. | |
| 2013/0165117 A1 | 1/2013 | Narayanan | |
| 2013/0040693 A1 | 2/2013 | Chen et al. | |
| 2013/0121194 A1 | 5/2013 | Heshmati | |
| 2013/0148567 A1 | 6/2013 | Efrati et al. | |
| 2013/0155842 A1 | 6/2013 | Moore et al. | |
| 2013/0203438 A1 | 8/2013 | Shin | |
| 2013/0225169 A1 | 8/2013 | Farnsworth et al. | |
| 2013/0227647 A1 | 8/2013 | Thomas et al. | |
| 2013/0230023 A1 | 9/2013 | Gray et al. | |
| 2013/0303156 A1 | 11/2013 | Astrom et al. | |
| 2014/0022919 A1 | 1/2014 | Dwivedi et al. | |
| 2014/0071895 A1 | 3/2014 | Bane et al. | |
| 2014/0080539 A1 | 3/2014 | Scherzer et al. | |
| 2014/0127992 A1 | 5/2014 | Kuscher et al. | |
| 2014/0148100 A1 | 5/2014 | Kim et al. | |
| 2014/0148170 A1 | 5/2014 | Damji et al. | |
| 2014/0211648 A1 | 7/2014 | Rahmati et al. | |
| 2014/0213256 A1 | 7/2014 | Meylan et al. | |
| 2014/0256283 A1* | 9/2014 | Lin | H04W 4/90 |
| | | | 455/404.2 |
| 2014/0274006 A1 | 9/2014 | Mutya et al. | |
| 2015/0098393 A1 | 4/2015 | Tofighbakhsh | |
| 2015/0127939 A1 | 5/2015 | Mazandarany et al. | |
| 2015/0141037 A1 | 5/2015 | Saha et al. | |
| 2015/0172859 A1* | 6/2015 | Syrjarinne et al. | H04W 88/06 |
| | | | 455/456.1 |
| 2015/0237497 A1* | 8/2015 | Chen | H04W 8/183 |
| | | | 455/558 |
| 2015/0281198 A1 | 10/2015 | Lee et al. | |
| 2016/0037340 A1 | 2/2016 | Rayment et al. | |
| 2016/0174182 A1* | 6/2016 | Lin | H04W 8/205 |
| | | | 455/435.1 |
| 2016/0205536 A1* | 7/2016 | Batchu | H04W 48/12 |
| | | | 455/558 |
| 2016/0261596 A1 | 9/2016 | Khello et al. | |
| 2016/0316410 A1* | 10/2016 | Tan et al. | H04W 36/30 |
| 2016/0381630 A1* | 12/2016 | Krishnamoorthy | H04W 76/14 |
| | | | 370/329 |
| 2017/0289788 A1 | 10/2017 | Lalwaney | |

FOREIGN PATENT DOCUMENTS

| | | |
|---|---|---|
| WO | 2002-041580 A1 | 5/2002 |
| WO | 2004-047476 A1 | 6/2004 |
| WO | 2006-005947 A1 | 1/2006 |
| WO | 2007000721 A2 | 1/2007 |
| WO | 2008060464 A1 | 5/2008 |
| WO | 2011-162688 A1 | 12/2011 |
| WO | 2013020598 A1 | 2/2013 |
| WO | 2013044359 A1 | 4/2013 |
| WO | 2014/011094 A1 | 1/2014 |
| WO | 2015158263 A1 | 10/2015 |

OTHER PUBLICATIONS

Silverman, Dwight, "Thinking of changing cellphone carriers? Check this app first," http://blog.chron.com/techblog/2011/06/thinking-of-changing-cellphone-carriers-check-this-app-first/, Houston Chronicle Techblog, Jun. 15, 2011.
VoLGA Forum, "VoLGA Stage 2 V1.7.0: Voice over LTE via Generic Access," Jun. 14, 2010.
Qualcomm Europe et al., "Text Proposal for UE Measurement for Minimizing Drive Tests," 3GPP TSG-RAN WG2 Meeting #66, R2-093175, May 4-8, 2009.
Qualcomm Europe, "Framework for UE SON Reports," 3GPP TSG RAN WG3 & SA WG5, S5-090017, Jan. 12-13, 2008.
CMCC, "Network Selection for WLAN/3GPP Radio Interworking," 3GPP TSG-RAN WG2 Meeting 81#bis, R2-130973, Apr. 15-19, 2013.
Nikravesh et al., "Mobile Network Performance from User Devices: A Longitudinal, Multidimensional Analysis," Passive and Active Measurement: 15th International Conference, PAM 2014, Mar. 10-11, 2014.
Venkiteswaran, Sriram, "Google Project Fi—New Era for Mobile Technology?", http://blog.mojonetworks.com/google-project-fi-new-era-for-mobile-technology, MojoBlog, May 19, 2015.
Movirtu, "Virtual SIM Platform: Decoupling the identity from the SIM card," www.movirtu.com/#!worklife-virtual-sim-platform/cuml, accessed Mar. 22, 2016.
Aptilo Networks, "Innovative Wi-Fi Offload Features," www.aptilo.com/mobile-data-offloading/innovative-wifi-offload-features, accessed Mar. 22, 2016.
Alcatel Lucent, "7750 Service Router Mobile Offload," Mar. 2016.
Sensorly, "With Sensorly you can . . ." www.sensorly.com, accessed Apr. 21, 2016.
Business Solutions; Sensorly helps wireless network professionals and mobile carriers develop and improve their activity via dedicated products and services; from www.sensorly.com; Sep. 1, 2015.
Unbiased Wireless Network Information. From people just like you.; from www.sensorly.com; Sep. 1, 2015.
About us; Sensorly is a free, crowdsourced coverage mapping service for wireless networks, available for all to use; from www.sensorly.com; Sep. 1, 2015.

(56) References Cited

OTHER PUBLICATIONS

Ericsson: "RAN-ANDSF Interwor", 3GPP Draft; R2-133440-WLAN 3GPP Radio Interworking—ANDSF Interworking, 3rd Generation Partnership Project (3GPP), Mobile Competence Centre; vol. RAN WG2; Sep. 27, 2013.
Ericsson et al.: "Analysis of WLAN-3GPP interworking solutions", 3GPP Draft; R2-131388—Analysis of WLAN 3GPP Interworking Solutions, 3rd Generation Partnership Project (3GPP), Mobile Competence Centre; vol. RAN WG2; Apr. 5, 2013.
Aptilo Inc.; "EAP-SIM and EAP-AKA authentication for mobile devices"; from https://web.archive.org/web/20160303105429/https://www.aptilo.com/aptilo-eap-sim-authentication-serverleap-sim-ada; Mar. 3, 2016.
Aptilo Inc.; "Innovative Wi-Fi Offload features"; from https://web.archive.org/web/20160303095650/https://www.aptilo.com/mobile-data-offloading/innovative-wifi-offload-features; Mar. 3, 2016.
European Patent Office; International Search Report and Written Opinion; International Application No. PCT/US2017/023955; dated Jun. 2, 2017.
U.S. Patent and Trademark Office; Non-Final Rejection; U.S. Appl. No. 14/689,857; dated Jun. 30, 2016.
Korean Intellectual Property Office, International Search Report and the Written Opinion in International Application No. PCT/US2014/057709 dated Dec. 29, 2014.
Ge et al., "A History-Based Handover Prediction for LTE Systems" Computer Network and Multimedia Technology. CNMT. International Symposium on , vol., No., pp. 1,4, Jan. 18-20, 2009.
Gemalto N.V. "Card ADMIN," Document Reference D1225357A (Jun. 2, 2011).
Dicoda.com. "Multi IMSI," Dicoda.com (Jun. 20, 2013) (available at: https://web.archive.org/web/20130620191315/http://www.dicoda.com/introduction/imsi).
Higginbotham, Stacey. "Is Apple About to Cut Out the Carriers?" Gigaom.com (Oct. 27, 2010) (available at: http://gigaom.com/2010/10/27/is-apple-about-to-cut-out-the-carriers/).
Tobias, Marc Weber. "The Split Personality Cell Phone That Saves You Money on Overseas Calling," Forbes.com (Aug. 20, 2013) (available at: http://onforb.es/14gMCe4).
"Circuit-switched fallback. The first phase of voice evolution for mobile LTE devices." Qualcomm Incorporated, 2012 11 pages.
CMSG, "Reprogrammable SIMs: Technology, Evolution and Implications," Final Report (Sep. 25, 2012) (available at: http://stakeholders.ofcom.org.uk/binaries/research/telecoms-researchireprogrammable-sims.pdf).
"Feature Requests—Republic Wireless Wiki," http://republic-wireless.wikia.com/wiki/Feature—Requests 1 page.
"Republic Wireless," http://republicwireless.com 2 pages.
"T-Mobile's 4G Network—Check Your Coverage—T-Mobile Blazing Fast 4G Coverage" 9 pages.
"What is VoLTE |Voice Over LTE | Tutorial," Radio-Electronics.com, http://www.radio-electronics.com/info/cellulartelecomms/lte-long-term-evolution/voice-over/lte-volte.php 5 pages.
Levy, Martyn, "Best-Practice Authentication Methods for Wi-Fi Offload," http://www.acurixnetworks.com/single-post/2013/05/20/BestPractice- Authentication-Methods-For-WiFi-Offload, May 20, 2013.
European Patent Office; International Search Report and Written Opinion; International Application No. PCT/US2016/027757; dated Jul. 7, 2016.

\* cited by examiner

| NETWORK ID (SIM PROFILE INFO) | PEER ID | NETWORK QUALITY MEASUREMENTS (RSSI, BANDWIDTH OR QUALITY LEVEL) | MEASUREMENT METADATA (LOCATION, TIME) |
|---|---|---|---|
| CURRENT NETWORK | n/a | WEAK | LAT., LON; TIME STAMP |
| NETWORKa | PEER 120 | STRONG | LAT., LON; TIME STAMP |
| NETWORKn | PEER 5 | WEAK | LAT., LON; TIME STAMP |

PEER DEVICE NETWORK QUALITY INFORMATION

FIG. 6

METHOD AND APPARATUS FOR PROVIDING PEER BASED NETWORK SWITCHING

BACKGROUND OF THE DISCLOSURE

Wireless mobile devices such as cell phones and other devices can now talk to more than one network carrier and switch between differing carrier networks. Differing networks may include differing wireless wide area networks (WWAN) such as differing cellular networks that communicate using different radio access technologies (RATs such as GSM, 4G LTE or other radio access technologies) as well as among wireless local area networks (WLAN) such as Wi-Fi networks. For example, where the wireless mobile device can switch among different carriers of different cellular networks (whether they use the same RAT or different RAT's) the mobile devices may automatically switch between different carriers to connect to another network to improve the strength of the current connection. The connection may be a voice call or data communication for example. Such wireless mobile devices may employ multiple SIM profiles, such as one profile for one carrier and another profile for another carrier. Where the same wireless RAT interface is used for both carriers, the wireless mobile device cannot access both carriers at the same time.

In operation, a mobile device, for example, may request network quality information for a given area from a network quality server that may be available through an internet web server or through one or more of the cellular networks. However, the network quality information is typically cached at a server and is not real time information. The network quality information may be obtained from a wireless network server or other source and may provide information regarding the bandwidth and speed and signal strength of a network at a particular geographic location based on prior network quality tests by the server or may be provided by other mobile devices that were using the network close to the prior location of interest. However, this information may be out of date and if used may result in the phone switching to a less desirable network degrading a user's connectivity.

Without knowing the actual strength of other available networks, wireless mobile devices may have to guess and use heuristics to decide when to switch to a different network. These historical network quality measurements sometimes provided by the network server to mobile devices do not provide real time network quality measurements. In some systems, the wireless mobile device may base its switching decision on signal strength such that if the signal strength of the current network dips below a certain threshold, the wireless device is switched to another network (e.g., from one wide area network to another wide area network having a different carrier, or to a wireless local area such as a Wi-Fi network).

In one example, in a debug mode in a wireless device, a user may be able to manually switch to a different cellular WWAN so when a user has come to believe that there could be a better signal on another network, the user can manually switch. However, this solution typically does not give a user network quality information about another network.

BRIEF DESCRIPTION OF THE DRAWINGS

The disclosure will be more readily understood in view of the following description when accompanied by the below figures and wherein like reference numerals represent like elements, wherein:

FIG. 6 is one example of peer device network quality state information in accordance with one example set forth in the disclosure.

SUMMARY OF THE DISCLOSURE

Figure 1:
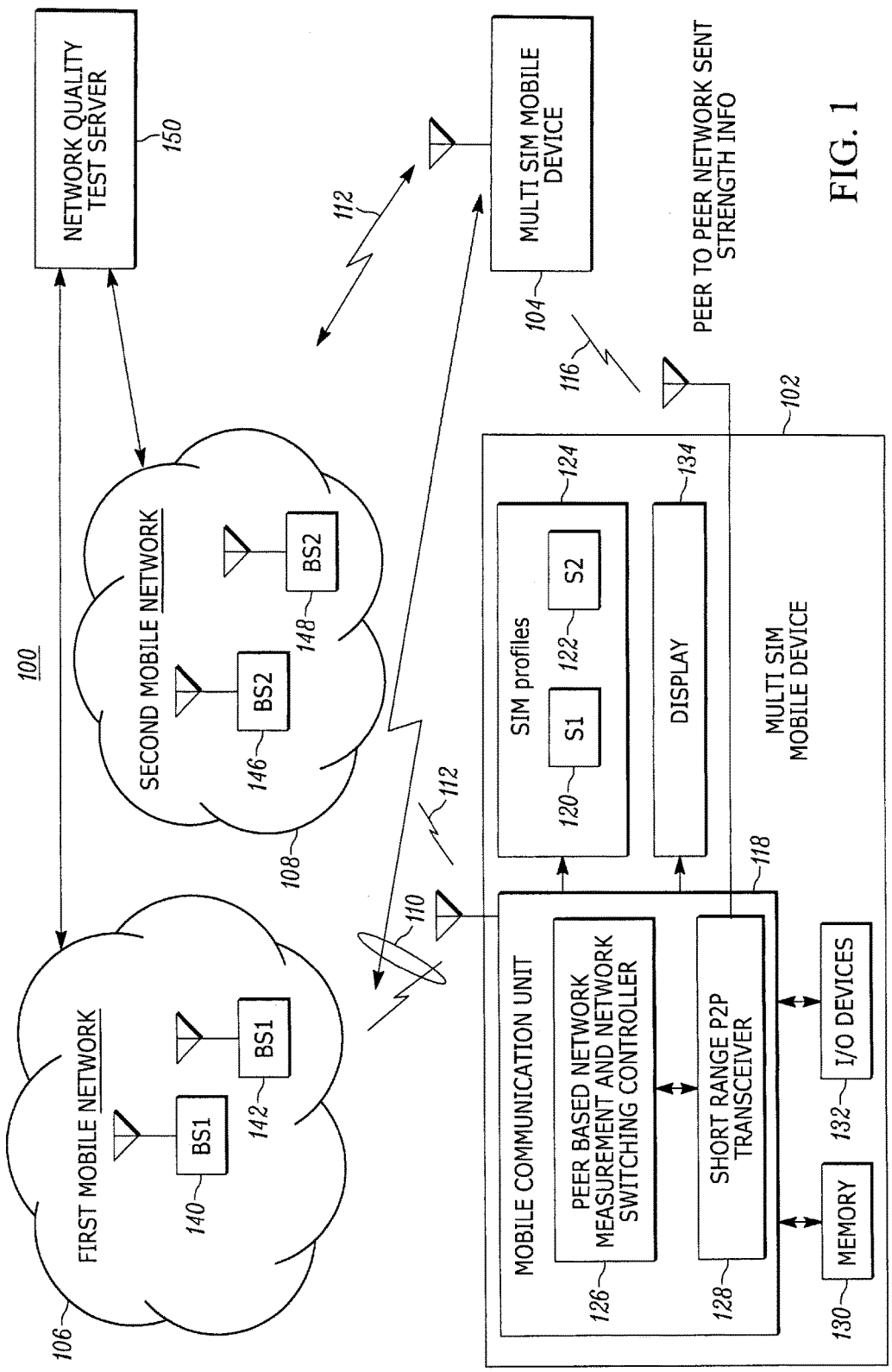
FIG. 1 is a block diagram generally illustrating one example of a communication environment employing wireless devices that employ multiple SIM profiles in accordance with one example set forth in the disclosure.

The disclosure relates to method and apparatus for facilitating switching between different networks by a wireless mobile device that employs a plurality of subscriber identification module profiles. Briefly, a mobile device that supports a plurality of SIM profiles each corresponding to a different wireless network, measures a current network quality of a first wireless network and obtains network quality information for a second wireless network as measured by the mobile peer device. The mobile device switches from the first wireless network to the second wireless network based on the obtained network quality information from the mobile peer device and based on the current network quality of the first wireless network by the mobile device. The network quality measurement received from the mobile peer device is provided through a wireless peer to peer communication link such as a Bluetooth link or other suitable non-internet protocol peer to peer communication link. The mobile peer device also supports a plurality of SIM profiles. Corresponding methods are also described.

In one example, the mobile device employs a peer based network measurement and network switching controller and real time network quality test module. The peer based network measurement and network switching controller allows mobile devices with multi-profile SIMs to communicate with other nearby multi-profile SIM mobile devices to determine the actual network quality of supported networks. This improves automatic switching between networks due to more accurate network quality information and can allow a current communication session to be uninterrupted when obtaining network quality measurements.

In another example, the mobile device determines that network quality information for the second wireless network is not available for the mobile device and in response, determines that the mobile peer device is in session on the first wireless network. The mobile device may tunnel a current communication session on the first wireless network to the mobile peer device through a secure peer to peer communication link such as a Bluetooth link. While tunneling the current communication session by the mobile device to the mobile peer device, the mobile device switches to the second wireless network and measures the network quality of the second wireless network thereby allowing its session and network one to continue through the mobile peer device while using its radio access technology to measure the quality of the second wireless network. If the measured network quality measurement of the second wireless network is stronger than the first wireless network, the mobile device remains on the second wireless network and moves the tunneled communication session to the second wireless network. Otherwise the mobile device returns the tunneled communication session from the mobile peer device back to the mobile device onto the first wireless network. Since a mobile device with multi-profile SIM has one profile per supported carrier, the mobile device measures the network quality by connecting to one carrier network via the mobile devices radio access technology system and uses a mobile peer device to measure a different carrier network. Network quality is, for example, a combination of metrics such, throughput, speed and signal strength of the network or can be represented as a single level such as high, medium and low. By tunneling through another mobile device, the techniques described herein allow more than one mobile device to determine any number of network quality levels without disrupting either device's current communication session. The technique involves peer to peer communication unlike current techniques that typically involve a mobile device and a network quality server.

In one example, the mobile peer device performs network quality measurements on a different network and provides the network quality information to the mobile device for the second network. If the second wireless network has stronger network quality than the first wireless network then the mobile device will switch to the second wireless network.

In one example, multiple mobile devices effectively merge network quality state information from differing networks. For example, each mobile device may combine the network quality information that they receive from other peer devices and replace their stored network quality information for given carriers with the received network quality information. If a particular mobile device does not have network quality measurement for a desired network, a discovery process may be used using the peer to peer communication link or through a server based approach such that the server may instruct devices as to what other mobile devices are in the area that can obtain the network quality information.

DETAILED DESCRIPTION OF EMBODIMENTS

Exemplary embodiments provide a technical solution that addresses one or more of the above problems by enabling a mobile device to obtain network strength measurements from a mobile peer device via a peer-to-peer communication. This enables the mobile device to determine any number of network strengths without disrupting a current session. Peer-to-peer network quality measurement exchanges are used among mobile devices to obtain real time network quality measurements of different networks from other mobile devices. In one example, a mobile device switches from a first wireless network to a second wireless network based on the obtained network quality information provided by the mobile peer device, and based on a current network quality of the first wireless network as measured by the mobile device. The mobile device may obtain network quality measurements from multiple mobile peer devices if there are multiple different networks to consider for carrying out a communication. When the mobile device is in a current communication, a tunneling operation can be used with mobile peer devices to obtain real time network quality measurements from the mobile peer devices while the mobile device is communicating using the first network.

Different SIM profiles can be used to switch to different networks based on real time network quality measurements obtained from other mobile devices, even during an ongoing session. Different SIM profiles can be available by the mobile device in any number of ways, such as but not limited to, having multiple SIM profiles stored on a single SIM card in the multi-SIM profile mobile device or by having multiple single-profile SIM cards in the multi-SIM profile mobile device or in any other suitable manner.

FIG. 1 illustrates one example of a communication environment 100 that includes a plurality of multi-SIM profile mobile devices 102 and 104 that can communicate with a plurality of different networks 106 and 108 via wireless communication channels 110 and 112 respectively. The wireless networks 106 and 108 may be any suitable wireless networks that are operated by different carriers such as GSM networks, LTE networks or any other suitable WWAN networks. For purposes of illustration, they will be referred to also as WWAN cellular networks. The multi-SIM mobile devices 102 and 104 also communicate with each other via a peer to peer communication link 116 such as a Bluetooth link or any other suitable non-IP (Internet protocol) wireless peer to peer communication link. Mobile device 102 includes a mobile communication unit 118 that may access multiple SIM profiles 120 and 122 that may be stored in memory 124 The memory 124 may be part of one or more SIM cards or other suitable data storage structure.

The mobile communication unit 118 includes any suitable radio access technology interface circuitry and control circuitry to allow communication with the differing wireless networks 106 and 108 as known in the art. In addition, the mobile device 102 includes a peer based network measurement and network switching controller 126 and may include or have access to a short range peer to peer transceiver 128 to create the peer to peer communication link 116. Mobile device 102 may also include memory 130 such as RAM, ROM or any other suitable memory that may store executable code modules that when executed by one or more processors, causes the processors to operate as the peer based network measurement and network switching controller 126. The mobile device 102 may also include known input/output devices 132 such as but not limited to touch pad interfaces, audible interfaces and any other suitable input/output devices as desired.

Mobile peer device 104 may include the same functions as mobile device 102 so that a group of mobile devices may create a network of peer to peer devices with network quality measurement and switching functions as described herein. For purposes of illustration only, discussion will be made with reference to two mobile devices 102 and 104 but any suitable number may be employed. The mobile device 102 may also include a display 134 which may be part of a touch panel display as known in the art to effect communication on networks 106 and 108 and any other networks. The mobile communication unit 118 may include any suitable base band processors and control processors as known in the art. In this example, the peer based network measurement and network switching controller 126 may be implemented as a programmed processor. However, it will be recognized that any suitable structure may be employed such as, but not limited to, application specific integrated circuits, digital signal processors, field programmable gate arrays, state machines or any suitable combination of processors and/or discrete logic.

Each of the cellular wireless networks (WWAN's) 106 and 108 may include a plurality of base stations 140, 142 and 146 and 148 respectively as known in the art. Although not shown, the plurality of networks may be coupled to the Internet or any other suitable networks as known in the art.

In another embodiment, a server 150 may also be in operative communication with the networks and mobile devices to provide recent network quality measurements that are measured by the wireless devices and sent to the server 150 for access by other mobile devices. For example, a mobile device may make a measurement as requested by a different mobile device and then send the recent measurement to the server. In this embodiment, another mobile device would download the recent measurement from the service 150 instead of through a peer to peer connection from another mobile device.

Figure 2:
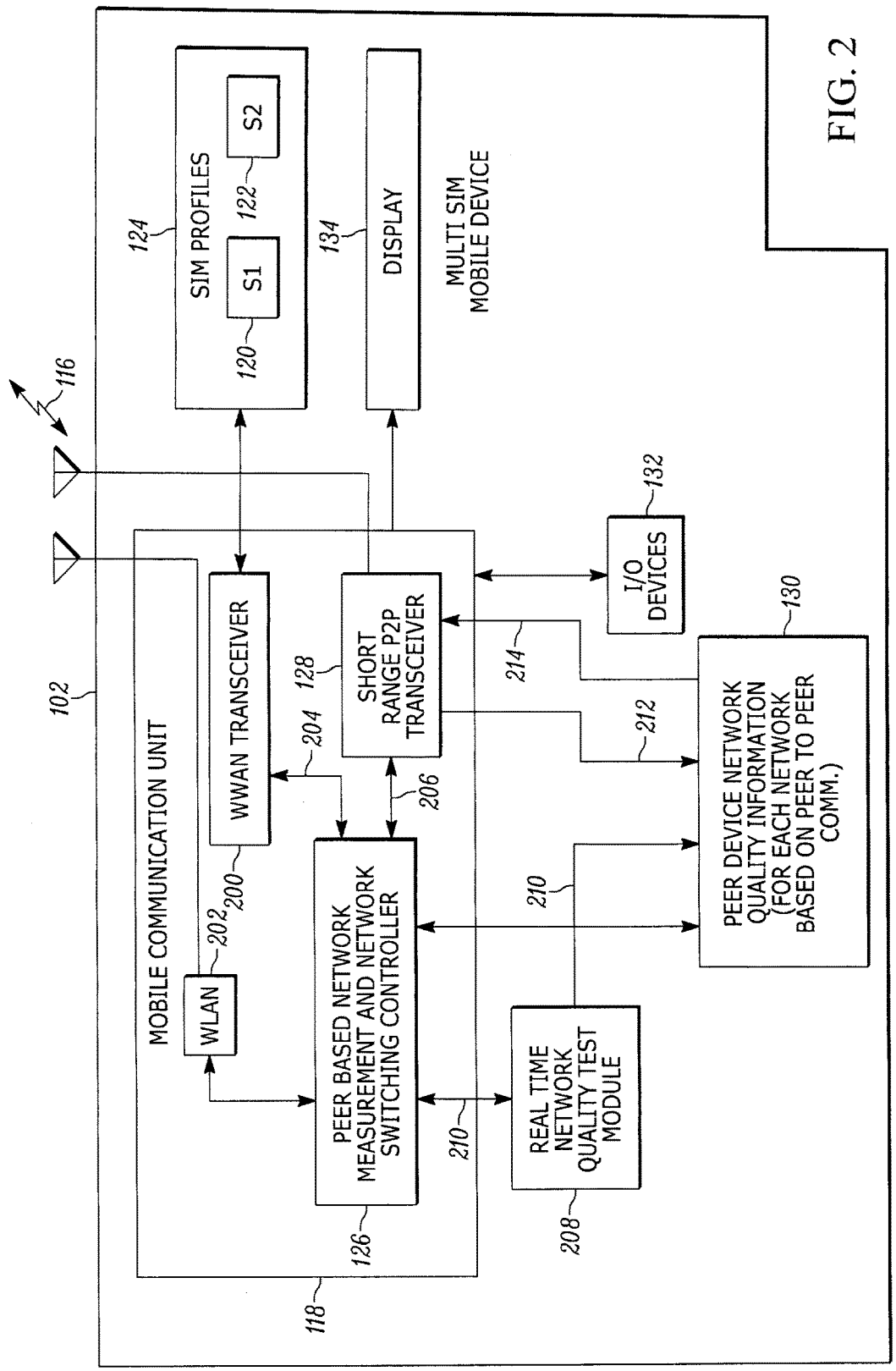
FIG. 2 is a block diagram illustrating one example of a mobile station employing multi-SIM profiles in accordance with one example set forth in the disclosure.

Referring to FIG. 2, a more detailed functional block diagram of the mobile device 102 is shown. In this example, the mobile communication unit 118 includes a wireless transceiver 200 such as a cellular WWAN transceiver that is operative to communicate with the first and second wireless networks 106 and 108 using the SIM profiles 120 and 122 respectively as known in the art. The mobile communication unit 118 also includes a WLAN transceiver 202 such as a Wi-Fi transceiver to allow the mobile device 102 to switch between cellular networks such as wireless networks 106 and 108, and one or more Wi-Fi networks. The peer based network measurement and network switching controller 126 is operatively coupled to the wireless transceiver 200 and to the short range peer to peer transceiver 128 through suitable communication links 204 and 206.

The memory 130 may store peer device network state information which may include, for example, network quality measurements which may include network quality levels as measured both by the wireless device 102 and measured by a mobile peer device 104 whose network quality measurements are communicated via the peer to peer communication link 116 as further described below. The mobile device 102 may measure a current network quality of a wireless network 106 or 108 using a real time network quality test module 208 which may be a processor that is programmed to operate as described herein. It may also be incorporated as part of the peer based network measurement and network switching controller 126 or may be implemented using any other suitable structure.

Figure 3:
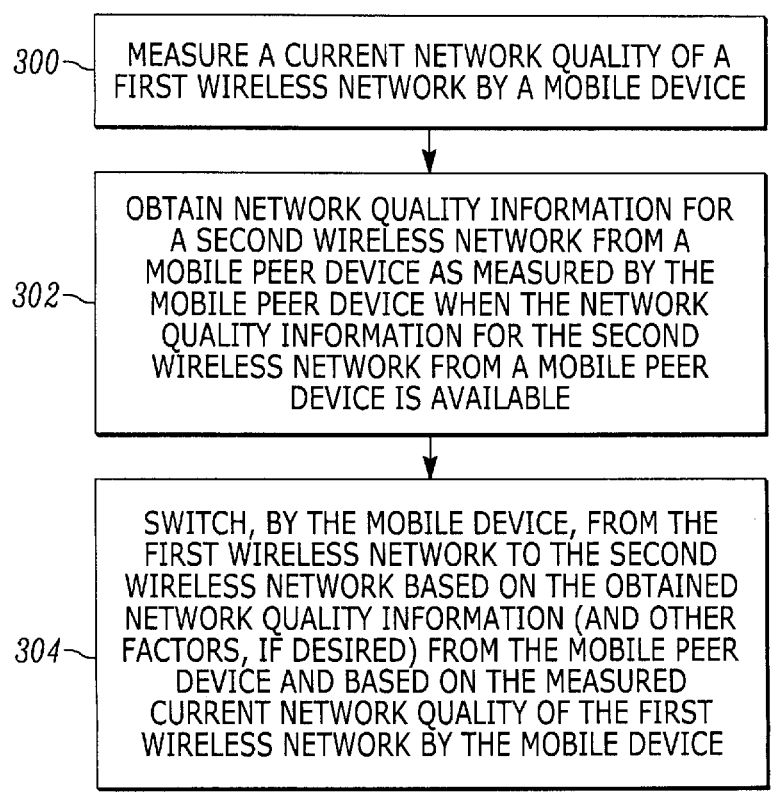
FIG. 3 is a flowchart illustrating one example of a method by a mobile device that supports a plurality of SIM profiles in accordance with one example set forth in the disclosure.

Referring also to FIG. 3, a method of operation of the mobile wireless device 102 will be described. As shown in block 300, the method includes measuring a current network quality of a first wireless network, such as wireless network 106 by the mobile device 102. This may be done through the peer based network measurement and network switching controller 126 by initiating network quality testing using the real time network quality test module 208. By way of example, when the wireless device 102 is connected to the wireless network 106, the mobile device 102 may take network quality measurements using the real time network quality test module 208. This may include, for example, obtaining a location of a mobile peer device, determining signal strength indications (SSI), running bandwidth measurement tests and by running data speed tests in real time with the network. This may include, for example, downloading data to the network and receiving response data and determining how much data can be transferred in a given amount of time. In addition, the rate or speed of the information may also be tested and response times may be determined given test data as known in the art. This network quality information, also referred to as state information may be stored in memory 130 (see FIG. 6) which is shown as current network quality information 210. The real time network quality test module 208 may be controlled through any suitable communication link as shown as link 210 via the peer based network measurement and network switching controller 126.

As shown in block 302, the method includes obtaining network quality information for the second wireless network 108 from a mobile peer device 104 as measured by the mobile peer device 104. This may be done, for example, by requesting the network quality information from the mobile peer device through the peer to peer communication link 116.

As shown in block 304, the method includes switching, by the peer based network measurement and network switching controller 126, from the first network 104 to the second network 106. This is done based on the obtained network quality information 212 from the mobile peer device and also based on the measured current network quality information 210 of the first wireless network as measured by the mobile device 102. The peer based network measurement and network switching controller 126 uses network quality measurements obtained by mobile peer devices and switches, for example, to the second wireless network 108 if the second wireless network has a stronger network quality than the first wireless network 106 based on the obtained network quality information from the mobile peer device 104. In one embodiment, only the network quality measurements are used to make the switching decision. In other embodiments, this information can be combined with other factors to make the switching decisions. For example, other factors may include battery level (e.g., no switching if battery on mobile device is too low), type of content for the session (e.g., no switching if the content is a voice call to prevent undesired interruption) or any other suitable factors. Also if desired, the mobile peer device may provide network quality measurements for a number of different networks.

For example, the peer based network measurement and network switching controller 126 compares the current measured network quality information 210 to the network quality information 212 of the second wireless network 108 as provided by the mobile peer device 104 and stored in memory 130. If the network quality of the second wireless network 108 has a stronger network quality then the network switching controller 126 may switch to the stronger network. Using network quality information 212 as measured by a peer device allows the current communication session to continue on the mobile device 102 without requiring the mobile device 102 to switch over and take the network quality measurements for a different network. The network quality information 212 for the second wireless network from the mobile peer device is preferably taken in real time. For example, the mobile peer device 104 may be instructed by the mobile device 102 to take the measurement via a request via the peer to peer link 116. When measurements are provided by the peer device, timestamps may be included by the mobile peer device and evaluated by the mobile device 102 to determine if the measurements are current such as within a time threshold (such as within a five second time frame or other suitable time frame). If the time threshold is not met, the measurements are not used and if desired, the mobile device may instruct the mobile peer device to obtain real time network measurements. Also, in one embodiment, updated network measurements for a single network could be used to update the database so that historical network measurements can be accessed. Also in an embodiment, network measurements could be monitored over time (e.g., trend up/down, average, variance) before making a switching decision.

When the mobile device 102 serves as a mobile peer device for another mobile device, it takes its own network quality measurements 210 and provides them as network quality information 214 to another mobile device such as mobile device 104 or other mobile device that is seeking the network quality measurement. In this embodiment, each of the mobile devices 102 and 104 can take measurements of a network and provide the network quality measurements to another mobile device through the peer to peer communication link 116. For example, the peer based network measurement and network switching controller 126 may invoke the real time network quality test module 208 to measure the current network quality of the first wireless network 106 if the mobile peer device 104 requested a measurement from the mobile device 102. The peer based network measurement and network switching controller 126 provides the measured current network quality 210 to the mobile peer device 104 using the peer to peer wireless transceiver 128 in response to a network quality measurement request received from the mobile peer device through peer to peer communication link 116. Where multiple mobile peer devices are in range of the mobile device, the mobile device may directly communicate with each of the in range mobile peer devices. In another example, communication among mobile peer device may be chained to operate as a relays amongst each other. For example, one mobile peer device may request another mobile peer device to provide network quality information which can then be relayed by the requesting mobile peer device to the mobile peer device. Any suitable number of mobile peer devices may be employed.

Figure 4:
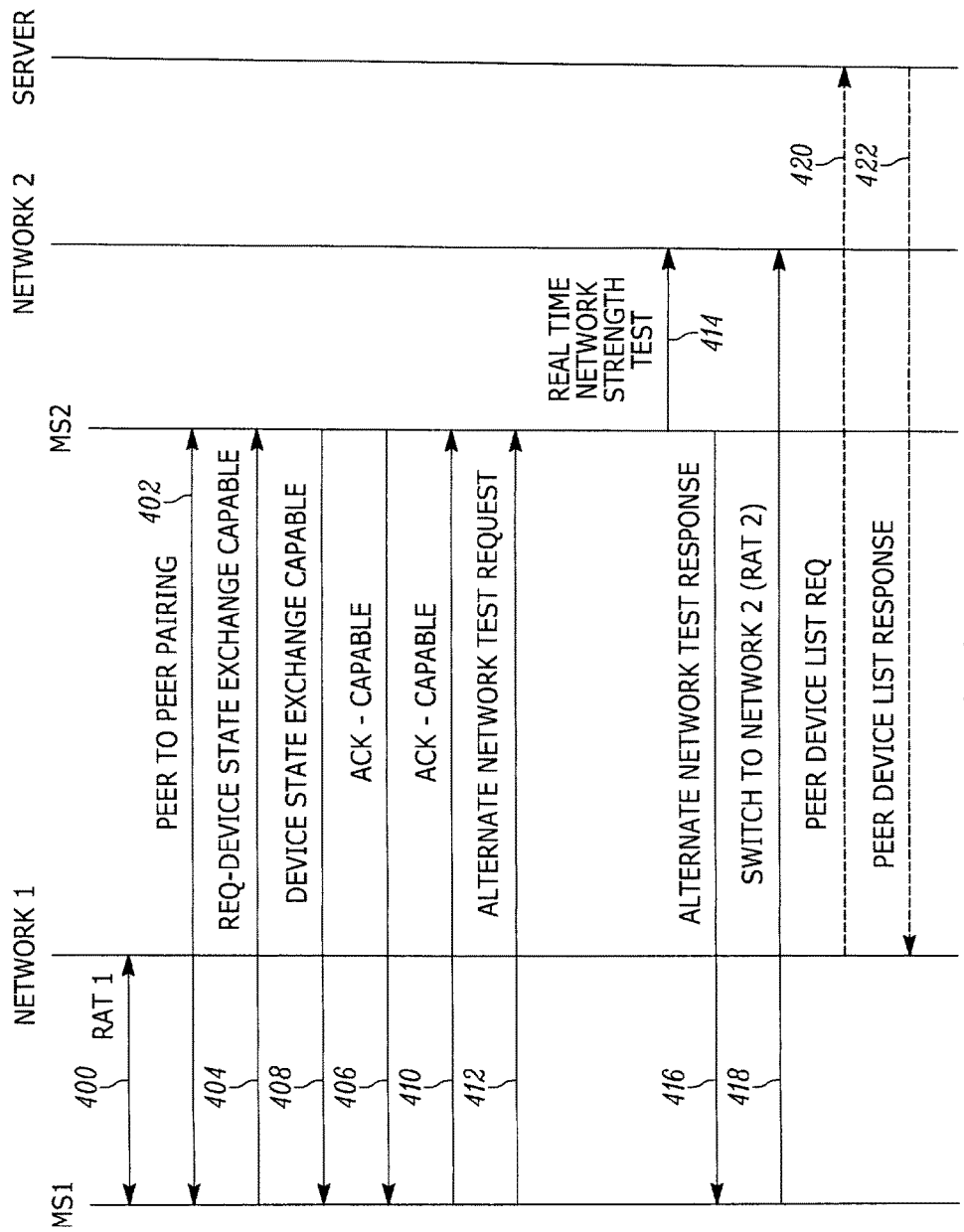
FIG. 4 is an example of communication flow among mobile devices in a system in accordance with one example set forth in the disclosure.
Figure 5:
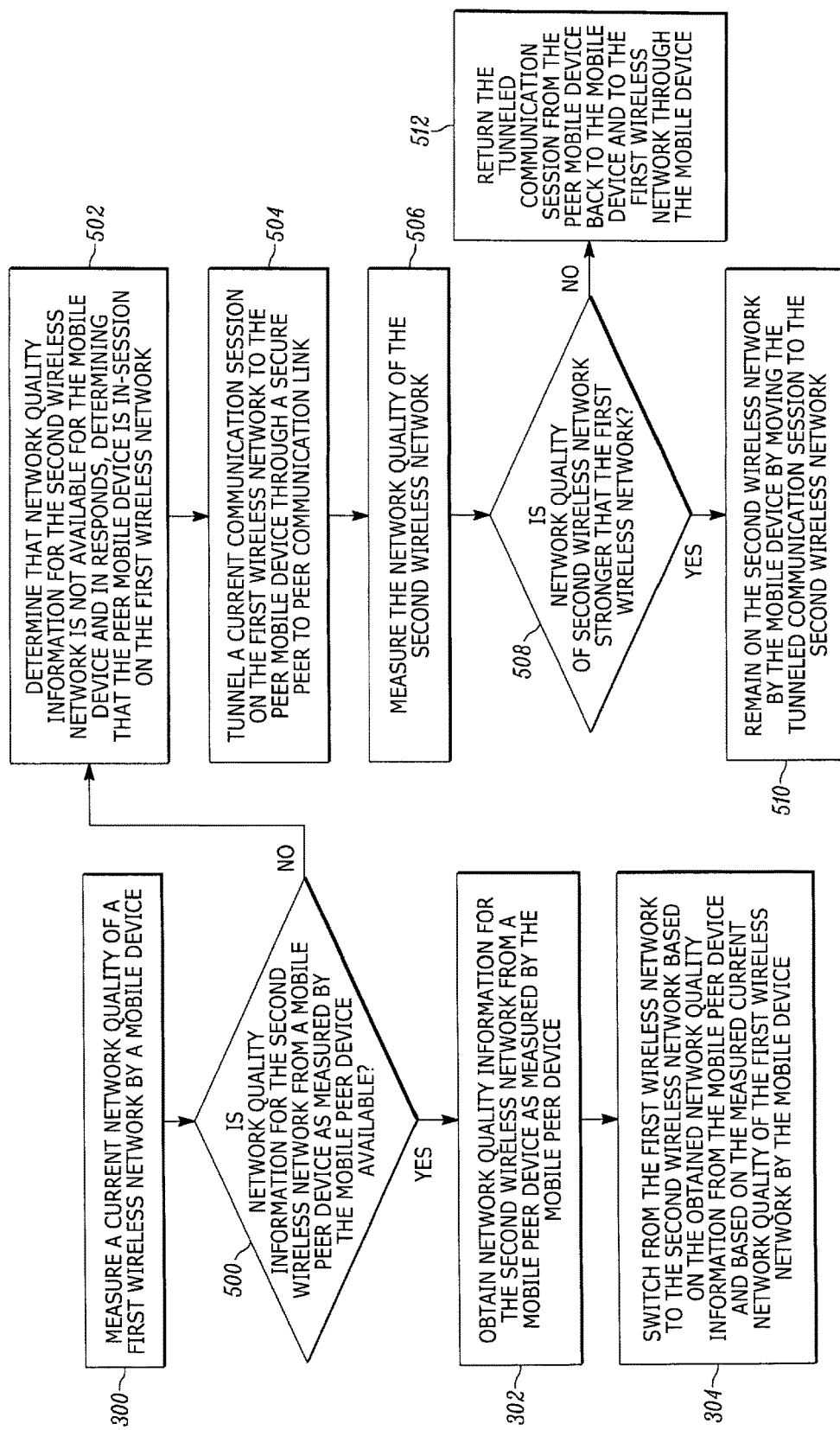
FIG. 5 is a flowchart illustrating one example of a method by a mobile device that supports a plurality of SIM profiles in accordance with one example set forth in the disclosure.

Referring to FIGS. 4 and 5, a description of communications between the mobile device 102 and the mobile peer device 104 and another example of the operation of the mobile device 102 will be described. As shown by arrow 400, the mobile device 102 may have a communication session set up with first network 106 through the WWAN transceiver 200 by employing the SIM profile 120. Prior to this session, the mobile device 102 may perform a real time network quality test to measure of a first mobile network as shown in block 300 using the real time network quality test module 208 resulting in the current network quality measurement information 210. Since the mobile device 102 is also capable of communicating on the second network, the mobile device 102 and mobile peer device 104 set up a peer to peer pairing as shown in block 402 by performing a Bluetooth pairing sequence, as known in the art. This may result in a secure peer to peer communication link being created such as link 116.

The network switching controller 126 may communicate with the mobile peer device 104 via the peer to peer wireless channel 116 and determine if the mobile peer device 104 is capable of measuring and providing network quality measurement for the second network through a request 404. The mobile peer device 106 may respond with a response indicating that it is capable of the exchange of a network quality measurement that was performed by the mobile peer device 104. Likewise, the mobile peer device may send a request 408 to the mobile device 102 asking if mobile device 102 is capable of exchanging network quality measurements to the mobile peer device 104. The mobile device 102 may send an acknowledgement that it is capable as shown by arrow 410. As shown by arrow 412, the mobile device 102 may send a request for the mobile peer device to measure the network quality of the second wireless network. The mobile peer device 104 then measures the network quality of the second network 108 using its on-board real time network quality testing module (like module 209 in the mobile device 102) and provides the network quality information back to the mobile device as shown by arrow 418.

Referring to FIG. 5, in another embodiment, as shown in block 500, when the mobile device is in-session with the first wireless network 104 and the network quality information for the second wireless network is not found in the peer device network information stored in memory 130, the method includes the controller 126 determining that network quality information for the second wireless network is not available for the mobile device and in response determines that the mobile peer device is in-session on the first wireless network as shown in block 502. In block 504 the controller 126 tunnels a current communication session on the first wireless network to the mobile peer device through a secure peer to peer communication link 116. In block 506, while tunneling the current communication session, the controller 126 measures the network quality of the second wireless network using the SIM profile corresponding to the second wireless network. As shown in block 508 if the measured network quality measurement of the second wireless network is stronger than the first network, the controller 126 remains on the second wireless network by moving the tunneled communication session from the mobile peer device to the second wireless network as shown in block 510. If the measurement on the second network is not stronger than the first network the method proceeds to block 512 where the controller 126 returns the tunneled communication session from the mobile peer device back to the mobile device and to the first wireless network.

In this embodiment tunneling refers to the mobile device using the mobile peer device as a proxy device for communicating over another network to start or continue a session started on the mobile device on a first network while measurements are taken by the mobile device on a different network. Stated another way, in one example, if there is a network in a state measurement table (see e.g., FIG. 6) that has not been measured, then the mobile device will measure the unmeasured network while tunneling its current session through a mobile peer device's connection to the first network (e.g., an already measured network) by using the mobile peer device as a proxy device to communicate the session. For example, HTTP requests that would normally be sent from the mobile device transceiver to a first network would be sent from the mobile device via the peer to peer link to the mobile peer device and the mobile peer device would use its transceiver for the first network to send the HTTP request on behalf of the mobile device and pass any response back to the mobile device via peer to peer link and act as a proxy for the mobile device for the session until the mobile device completes the measurement process as needed.

FIG. 6 illustrates one example of peer device network quality information that may be stored in memory 130 for example. The information is updated with peer device network quality information such as quality measurements 602 that can include receive signal strength indications, bandwidth amounts for a network, network speed or an overall quality level such as high, medium or low. In addition, measurement metadata can be included which can include the location of the peer device when it took the measurement as well as the time of day of the measurement (e.g., a timestamp). A peer identifier may be provided as well indicating which peer device took the measurement along with the network ID identifying which network was measured. This peer device network quality information is a type of combined network quality state information taken both by the current mobile device on the current network as well as from peer devices on other networks.

Merging of network quality information may occur by, for example, the peer based network measurement and network switching controller 126 looking at the peer device network quality information and determine that a particular network of interest has not been updated to include network quality information and may then request that a peer device obtain such information. Stated another way, a mobile device may maintain a network quality measurement for every carrier for which it has a profile along with network quality measurement information for its current carrier network (the network used for the current session). The network ID may correspond to a particular carrier. The information in FIG. 6 serves as a map of carrier profiles to network quality measurements. When a mobile device encounters another capable mobile device, the mobile devices can exchange device states to create the merged network quality state information table as shown in FIG. 6. Merging of the network quality measurements may include the combining of quality measurements that were not previously in memory as described for example with respect to FIG. 5, replacing newer measurements with older measurements for a given carrier by evaluating the time stamp measurement metadata and storing a most recent measurement as obtained from other mobile peer devices if there is a more recent measurement received from other mobile peer devices. Discovery of network quality measurements may be done through the use of the peer to peer communication link or if desired, a server based approach where the server instructs the mobile device what other mobile devices are in an area. If all desired networks have network quality measurements, then each mobile device can use the information to determine an appropriate switching decision.

In one example, if there is a network in the merged information that has not been measured, a mobile device may measure the un-measured network while tunneling its current session through the other device's connection. This can be done as described with reference to FIG. 5. Mobile devices can evict network quality measurements that are deemed to be stale due to a change in location, arbitrarily over time or because of any other desired factors. By way of further example, merging is the combining of information in the Referring back to FIG. 4, if tunneling is not to be employed, and the peer device is capable of performing a network quality measurement on the second network, as shown in communications 414 and 416, a real time network strength test is performed by the mobile peer device on the second wireless network and the network quality measurements 416 are then provided back to the mobile device 102 via the peer to peer communication channel. As shown by communication 418, if for example the network quality is better on the second wireless network, then the mobile device 102 switches to the second network.

In another embodiment if desired, a server such as a web server or other server coupled to the second wireless mobile network or the first wireless mobile network may accumulate a list of mobile peer devices in a geographic area so that any mobile device can request the list of peer devices as shown by communication 420. A peer device list response is then provided by the server as shown in communication 422 providing a list of mobile peer devices for which the mobile device 102 can communicate to obtain network quality measurements.

Among other advantages, in one example, by tunneling through another mobile device, one mobile device is allowed to determine any number of network strengths without disrupting either device's current session. Among other advantages, the described approaches are easily scalable because the approaches involve peer to peer network quality measurement exchanges. Open communication protocols can be employed and the operation described herein avoids a single point of failure and can be more fault tolerant than a conventional client-server model. Communicating network quality measurements and other information over peer to peer links does not require a network so that devices without networks can still determine the best network to connect to without experimenting blindly. Other advantages will be recognized by those of ordinary skill in the art.

In situations in which the systems and methods discussed herein may collect personal information about users, or may make use of personal information (e.g., user data), users are provided with one or more opportunities to control how information is collected about the user and used in one or more described features. A user is provided with control over whether programs or features collect user data (e.g., information about a user's social network, user characteristics (age, gender, profession, etc.), social actions or activities, a user's preferences, content created or submitted by a user, a user's current geographic location, etc.). A user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more control options over a communication network. In addition, certain data may be treated in one or more ways before it is stored or used, so that personally identifiable information is removed. For example, a user's identity may be treated so that no personally identifiable information can be determined for the user, or a user's geographic location may be generalized to a larger region so that a particular location of a user cannot be determined.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine or dedicated logic capable of producing the same effect are also contemplated.

What is claimed is:

1. A method by a mobile device that supports a plurality of subscriber identification module (SIM) profiles where a first SIM profile is used to communicate with a first wireless network and a second SIM profile is used to communicate with second wireless network, the method comprising:
    measuring a current network quality of the first wireless network by the mobile device;
    obtaining, by the mobile device, network quality information for the second wireless network from a mobile peer device as measured by the mobile peer device when the network quality information for the second wireless network from a mobile peer device is available, wherein the mobile device and mobile peer device are different devices; and
switching, by the mobile device, from the first wireless network to the second wireless network based on the obtained network quality information from the mobile peer device and based on the measured current network quality of the first wireless network by the mobile device.

2. The method of claim 1 comprising providing the measured current network quality to the mobile peer device in response to a network quality measurement request from the mobile peer device.

3. The method of claim 1 comprising:
determining, by the mobile device, that network quality information for the second wireless network is not available for the mobile device and in response determining, by the mobile device, that the mobile peer device is in-session on the first wireless network;
tunneling, by the mobile device, a current communication session on the first wireless network to the mobile peer device through a secure peer to peer communication link;
while tunneling the current communication session, switching to the second wireless network, by the mobile device, comprises measuring the network quality of the second wireless network; and
if the measured network quality measurement of the second wireless network is stronger than the first network, remaining on the second wireless network by the mobile device by moving the tunneled communication session to the second wireless network, otherwise returning the tunneled communication session from the mobile peer device back to the mobile device and to the first wireless network through the mobile device.

4. The method of claim 1 wherein switching, by the mobile device, from the first wireless network to the second wireless network comprises switching to the second wireless network if the second wireless network has a stronger network quality than the first wireless network.

5. The method of claim 1 wherein obtaining the network quality information for the second wireless network from the mobile peer device as measured by the mobile peer device comprises updating peer device network quality state information in the mobile device with the network quality information for the second wireless network as measured by the mobile peer device.

6. The method of claim 1 comprising communicating with the mobile peer device via a peer to peer wireless channel and determining if the mobile peer device is capable of measuring and providing network quality measurements for the second wireless network.

7. The method of claim 1 wherein obtaining the network quality information for the second wireless network from the mobile peer device as measured by the mobile peer device comprises at least one of:
receiving network quality information for the second network from the mobile peer device in response to a network quality measurement request sent from the mobile device; and
determining that the measured network quality information was measured within a desired time frame.

8. A mobile device comprising:
a subscriber identification module (SIM) card comprising a plurality of SIM profiles where a first SIM profile enables interfacing with a first wireless network and a second SIM profile enables interfacing with second wireless network;
a wireless transceiver operative to communicate with the first and second wireless networks;
a peer to peer wireless transceiver;
a controller operatively coupled to the wireless transceiver and to the peer to peer wireless transceiver, and operative to:
measure a current network quality of the first wireless network by the mobile device;
obtain, by the mobile device, network quality information for the second wireless network from a mobile peer device as measured by the mobile peer device when the network quality information for the second wireless network from a mobile peer device is available, wherein the mobile device and mobile peer device are different devices; and
switch, by the mobile device, from the first wireless network to the second wireless network based on the obtained network quality information from the mobile peer device and based on the measured current network quality of the first wireless network by the mobile device.

9. The mobile device of claim 8 wherein the controller is operative provide the measured current network quality to the mobile peer device using the peer to peer wireless transceiver in response to a network quality measurement request from the mobile peer device.

10. The mobile device of claim 8 wherein the controller is operative to:
determine that network quality information for the second wireless network is not available for the mobile device and in response determine that the mobile peer device is in-session on the first wireless network;
tunnel a current communication session on the first wireless network to the mobile peer device through a secure peer to peer communication link;
while tunneling the current communication session, measuring the network quality of the second wireless network; and
if the measured network quality measurement of the second wireless network is stronger than the first network, remaining on the second wireless network by moving the tunneled communication session to the second wireless network, otherwise returning the tunneled communication session from the mobile peer device back to the mobile device and to the first wireless network the wireless transceiver.

11. The mobile device of claim 8 where in the controller is operative to switch to the second wireless network if the second wireless network has a stronger network quality than the first wireless network.

12. The mobile device of claim 8 wherein the controller obtains the network quality information for the second wireless network from the mobile peer device as measured by the mobile peer device using a peer to peer wireless channel through the peer to peer wireless transceiver and updates peer device network quality state information in the mobile device with the network quality information for the second wireless network as measured by the mobile peer device.

13. The mobile device of claim 8 wherein the controller is operative to communicate with the mobile peer device via a peer to peer wireless channel and determine if the mobile peer device is capable of measuring and providing network quality measurements for the second wireless network.

14. A communication environment comprising:
a mobile device; and
at least one mobile peer device;
the mobile device comprising:
a plurality of subscriber identification module (SIM) profiles where a first SIM profile is used to communicate with a first wireless network and a second SIM profile is used to communicate with second wireless network;
a wireless transceiver operative to communicate with the first and second wireless networks;
a peer to peer wireless transceiver;
a controller operatively coupled to the wireless transceiver and to the peer to peer wireless transceiver, and operative to:
measure a current network quality of the first wireless network by the mobile device;
obtain, by the mobile device, network quality information for the second wireless network from a mobile peer device as measured by the mobile peer device when the network quality information for the second wireless network from a mobile peer device is available, wherein the mobile device and mobile peer device are different devices; and
switch, by the mobile device, from the first wireless network to the second wireless network based on the obtained network quality information from the mobile peer device and based on the measured current network quality of the first wireless network by the mobile device;
the mobile peer device operative to produce network quality information for the second network by measuring the network quality of the second network in response to a network quality measurement request from the mobile device.

15. The system of claim 14 where in the mobile peer device is operative to provide to the mobile device the measured network quality information only when the measured network quality information was measured within a desired time frame.

16. The system of claim 14 wherein the controller is operative to provide the measured current network quality to the mobile peer device using the peer to peer wireless transceiver in response to a network quality measurement request from the mobile peer device.

17. The system of claim 14 wherein the controller is operative to:
determine that network quality information for the second wireless network is not available for the mobile device and in response determine that the mobile peer device is in-session on the first wireless network;
tunnel a current communication session on the first wireless network to the mobile peer device through a secure peer to peer communication link;
while tunneling the current communication session, measuring the network quality of the second wireless network; and
if the measured network quality measurement of the second wireless network is stronger than the first network, remaining on the second wireless network by moving the tunneled communication session to the second wireless network, otherwise returning the tunneled communication session from the mobile peer device back to the mobile device and to the first wireless network the wireless transceiver.

18. The system of claim 14 where in the controller is operative to switch to the second wireless network if the second wireless network has a stronger network quality than the first wireless network.

19. The system of claim 14 wherein the controller obtains the network quality information for the second wireless network from the mobile peer device as measured by the mobile peer device using a peer to peer wireless channel through the peer to peer wireless transceiver and updates peer device network quality state information in the mobile device with the network quality information for the second wireless network as measured by the mobile peer device.

20. The system of claim 14 wherein the controller is operative to communicate with the mobile peer device via a peer to peer wireless channel and determine if the mobile peer device is capable of measuring and providing network quality measurements for the second wireless network.

\* \* \* \* \*